Jan. 23, 1962  E. A. LANDSCHULZE  3,017,963
MOVING STAIRWAYS, ESCALATORS AND THE LIKE
Filed Nov. 5, 1959  2 Sheets-Sheet 1

Jan. 23, 1962 E. A. LANDSCHULZE 3,017,963
MOVING STAIRWAYS, ESCALATORS AND THE LIKE
Filed Nov. 5, 1959 2 Sheets-Sheet 2

United States Patent Office 3,017,963
Patented Jan. 23, 1962

3,017,963
MOVING STAIRWAYS, ESCALATORS
AND THE LIKE
Ernst A. Landschulze, Hamburg, Germany, assignor to Rheinstahl Hamburg Stahlbau Eggers & Friedrich Kehrhahn G.m.b.H., Hamburg, Germany
Filed Nov. 5, 1959, Ser. No. 851,127
11 Claims. (Cl. 188—82.34)

The present invention relates to improvements in moving stairways, escalators and the like. In such apparatus it is necessary for safety reasons to provide two braking devices arranged independently of one another, namely a service brake and an emergency brake.

In such conveying installations, the braking devices are usually arranged directly on the driving motor. While the service brake is actuated electrically, for example by operation of a push-button switch, the emergency brake is intended in particular to automatically prevent unintentional reverse travel of the moving stairway.

Unintentional reverse travel of this kind could occur, for example, if the current supply were broken and the service brake did not come into operation for some reason or another, so that the emergency brake has to come into operation automatically.

In known devices of this kind considerable difficulties are entailed in arranging the braking devices in such a manner that in addition to the forward travel of the moving stairway intentional reverse travel can take place without one or other braking device stopping the desired movement.

The object of the invention is to overcome these difficulties by rendering the emergency brake operative in the event of unintentional reverse travel. This is done by means of a mechanism having a pawl which, in the case of normal forward travel of the moving stairway, is always guided over a notch without being able to engage, while in the case of unintentional reverse travel the pawl engages in the notch and renders the emergency brake operative, for example by way of a pull-rod.

Figure 1:
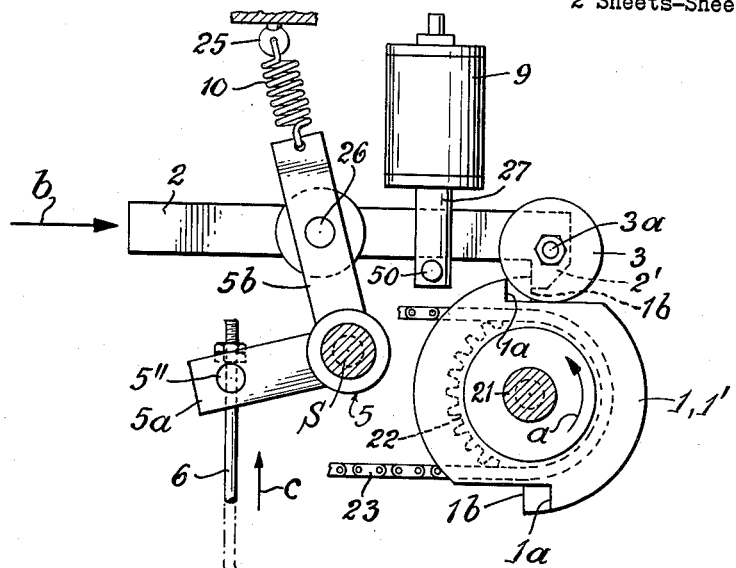
Figure 3:
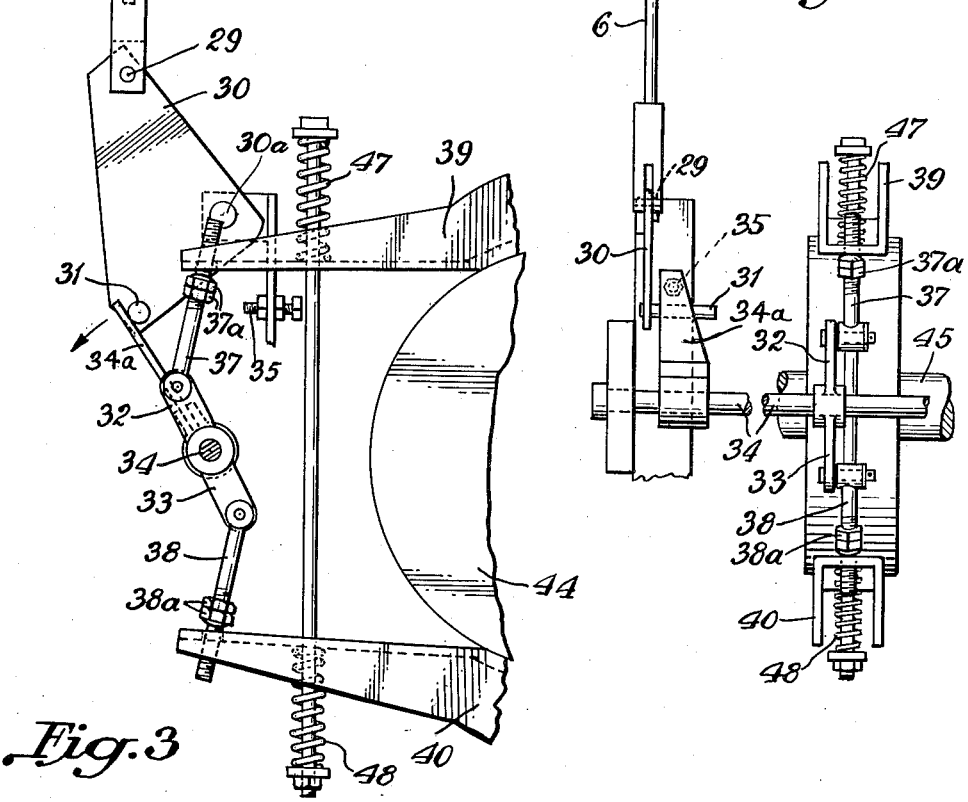
Figure 2:
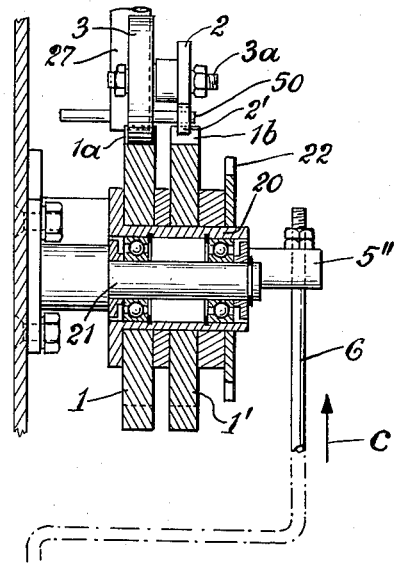
Figure 2:
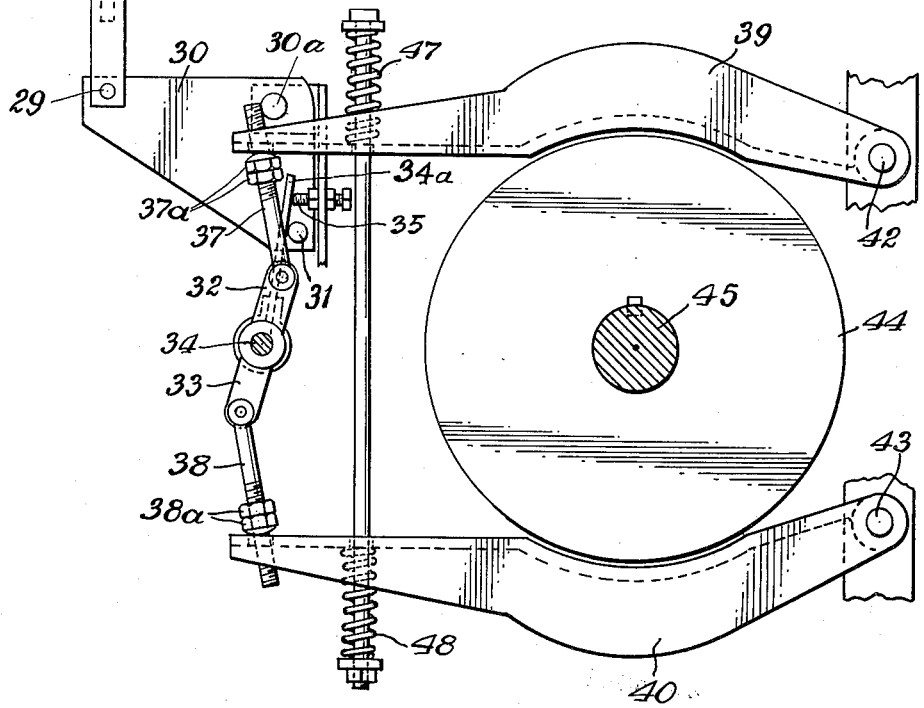

One embodiment of the subject of the invention is illustrated diagrammatically and by way of example in the accompanying drawings, wherein FIG. 1 is a broken side view showing the device in two sections slightly offset with respect to each other;

FIG. 2 is a front view of the device with the emergency brake in inoperative position, and FIG. 3 shows the emergency brake in its applied or operative position.

The safety device shown includes two discs 1 and 1' provided each with two notches 1a and 1b respectively. The discs 1 and 1' are fixedly mounted on a sleeve 20 which is rotatable on a horizontally disposed fixed shaft 21. The sleeve 20 has also fixed thereon at its outer end a sprocket wheel 22. When the moving stairway is travelling in the forward direction the said discs 1 and 1' are driven in the direction of the arrow $a$ by a drive unit which engages said sprocket wheel 22 with an endless chain 23.

Above the two discs 1, 1' is disposed a horizontally disposed lever arm 2 having at one end a pawl 2' and laterally spaced therefrom on a pivot pin 3a a roller 3. The roller 3 rests on the periphery of the disc 1 and when the latter rotates the notches 1a engage the roller 3 and thus successively lift and lower the pawl 2'. In the forward direction of the arrow $a$ and at the relatively high speed of the discs 1, 1' the pawl 2' drops clear of the face of notch 1b of the disc 1' so that the pawl is substantially protected from premature wear. The notches 1a and 1b of each pair of notches are preferably offset in relation to one another so as to ensure the quietest and smoothest passage of the pawl possible, and they are arranged relatively to the roller 3 and to the pawl 2' respectively as shown in FIG. 1.

If the forward travel of the moving stairway is interrupted for some reason without the service brake coming into operation owing to a fault, the discs 1, 1' are set into rotation in opposition to the direction of the arrow $a$ particularly when the moving stairway is loaded. The pawl 2' then comes into engagement with one of the notches 1b, before it is lifted by the roller 3 and in so doing moves the horizontal lever arm 2 substantially horizontally in the direction of the arrow $b$.

This horizontal displacement of the lever arm 2 is converted into a vertical movement of a pull-rod 6 by means of a bell crank lever 5 which is pivotally mounted at its apex by a pin S to the frame of the device and has connected to the end of its longer arm 5b one end of a tension spring 10 the other end of which is anchored at 25. This spring 10 has the function to urge the longer arm 5b of the lever 5 into its "dead center" position with reference to its pivot axis S whenever the arm 5b is moved in one direction or the other in the manner of a toggle. The arm 5b is pivotally connected between its ends to the lever arm 2 by means of a pivot pin 26.

The short arm 5a of the bell crank lever 5 is pivotally connected to the upper end of a substantially vertically disposed pull-rod 6 by means of a lateral pin 5''. The lower end of the pull-rod 6 acts on the emergency brake as soon as the pull-rod is vertically moved in the direction of the arrow $c$. The lower end of the pull-rod 6 is pivotally connected at 29 to an angle plate 30 which is pivoted at 30a to serve as a bell crank. The plate 30 by means of a pin 31 is operatively connected by an arm 34a on a shaft 34 to a double eccentric shown as two oppositely directed arms 32, 33. In the inoperative position of the emergency brake the arm 34a is positioned in clockwise direction just beyond the upper dead center position of the eccentric and engages a fixed stop 35. The extreme ends of the arms 32 and 33 are pivotally connected by rods 37, 38 and nuts 37a and 38a adjustably with the free ends of brake shoes 39 and 40 respectively, the other ends of which are pivotally supported at 42 and 43 respectively. The arrangement is such that in the position of the arms 32 and 33 shown in FIG. 2 the brake shoes 39 and 40 do not engage the brake drum 44 mounted on the shaft 45.

When the pull-rod 6 is raised, however, the double arms 32, 33 are rotated counterclockwise about their common axis 34 into the position shown in FIG. 3, and the brake shoes 39, 40 are caused to engage the brake drum 44. A pressure spring arrangement 47, 48 connecting the free ends of the brake shoes with each other assists in applying the brake shoes.

Since moving stairways of the kind described are used mainly for the conveyance of passengers along an inclined plane upwardly and downwardly, that is to say forwardly and reversely, steps must be taken to assure these two movements. Without special measures being taken an intentional reverse travel of the moving stairway is impossible, since on rotation of the discs 1 and 1' in opposition to the direction of the arrow $a$ the emergency brake 44 would be operated automatically.

In order to permit an intentional reverse travel of the moving stairway, a solenoid 9 is provided which is mounted on the machine frame above the horizontal lever arm 2. The armature 27 of this solenoid 9 is provided with a transverse pin 50. The lever arm 2 rests on this pin 50 so that on the upward stroke of the armature both the roller 3 and the pawl 2' are lifted from the discs 1, 1'. This causes the mechanism for the automatic operation of the emergency brake to come out of engagement or to be rendered ineffective. In this condition the emergency brake comes into operation only when the reverse conveying speed exceeds a predetermined value in consequence of a fault because in that case a centrifugal governor for instance becomes operative for rendering the emergency brake operative.

What I claim is:

1. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; and means urging said pawl to a second position spaced forwardly from said first position, said pawl being disposed in said path of movement of the shoulder to be moved rearwardly to said first position by a rearward movement of said shoulder.

2. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; and means selectively preventing engagement of the pawl with said shoulder during forward movement of said shoulder.

3. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; and means selectively operative to maintain said pawl out of the path of movement of said shoulder during intentional reverse movement thereof.

4. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; means selectively preventing engagement of the pawl with said shoulder during forward movement of said shoulder; and means selectively operative to maintain said pawl out of the path of movement of said shoulder during intentional reverse movement thereof.

5. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; means selectively preventing engagement of the pawl with said shoulder during forward movement of said shoulder, said linkage including a first arm pivoted about a fixed axis and a second arm pivoted on the first arm and carrying said pawl for arcuate movement about a second axis without pivotal movement of said first arm; and means selectively operative to maintain said pawl out of the path of movement of said shoulder during intentional reverse movement thereof.

6. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction od movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; means selectively preventing engagement of the pawl with said shoulder during forward movement of said shoulder, said linkage including a first arm pivoted about a fixed axis and a second arm pivoted on the first arm and carrying said pawl for arcuate movement about a second axis without pivotal movement of said first arm; and means selectively operative to maintain said pawl out of the path of movement of said shoulder during intentional reverse movement thereof, said urging means comprising a coil spring connected at one end to said first arm and fixed at its opposite end to extend normally along a radius projected from said fixed axis.

7. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; means urging said pawl to a second position spaced forwardly from said first position, said pawl being disposed in said path of movement of the shoulder to be moved rearwardly to said first position by a rearward movement of said shoulder; means selectively preventing engagement of the pawl with said shoulder during forward movement of said shoulder, said linkage including a first arm pivoted about a fixed axis and a second arm pivoted on the first arm and carrying said pawl for arcuate movement about a second axis without pivotal movement of said first arm; and means selectively operative to maintain said pawl out of the path of movement of said shoulder during intentional reverse movement thereof, said urging means comprising a coil spring connected at one end to said first arm and fixed at its opposite end to normally extend along a radius projected from said fixed axis, said shoulder being disposed between said pawl and said radius when engaging said pawl to move it rearwardly to said first position.

8. Apparatus for preventing unintentional reverse operation of a selectively reciprocably driven mechanism, such as a moving stairway, comprising: a pair of discs selectively forwardly and rearwardly rotated about a common axis in correspondence with the movement of the mechanism, one of said discs having a peripheral notch defining a radial shoulder; a pawl adjacent the periphery of said one disc; a normally inoperative brake; linkage connecting said pawl and said brake arranged to operate said brake when said pawl is disposed in a first preselected position; means urging said pawl to a second position spaced from said first position, said pawl being normally biased into the path of said notch for movement of the pawl with said one disc to said one position upon unintentional reverse movement of the mechanism; and means preventing movement of the pawl into said notch during intentional reverse movement of the mechanism.

9. Apparatus for preventing unintentional reverse operation of a selectively reciprocably driven mechanism, such as a moving stairway, comprising: a pair of discs selectively forwardly and rearwardly rotated about a common axis in correspondence with the movement of the mechanism, one of said discs having a peripheral notch defining a rearwardly facing radial shoulder; a pawl adjacent the periphery of said one disc; a normallly inoperative brake; linkage connecting said pawl and said brake arranged to operate said brake when said pawl is disposed in a first preselected position; means urging said pawl to a second position spaced from said first position, said pawl being normally biased into the path of said notch for movement of the pawl with said one disc to said one position upon unintentional reverse movement of the mechanism; means preventing movement of the pawl into said notch during intentional reverse movement of the member; and a guide on said linkage engaging the periphery of the second disc for directing the pawl away from engagement with said shoulder during forward rotation of the discs.

10. The apparatus of claim 8 wherein the second disc is provided with a peripheral notch receiving the guide when the pawl is rearwardly circumferentially juxtaposed to said shoulder.

11. Apparatus for preventing unintentional reverse operation of a selectively reciprocably driven mechanism, such as a moving stairway, comprising: a member driven selectively forwardly and rearwardly in accordance with the movement of the mechanism and having a shoulder facing in the rearward direction of movement thereof; a pawl adjacent the path of movement of said shoulder; a normally inoperative brake; linkage connecting said pawl and said brake arranged to operate said brake when said pawl is disposed in a first preselected position; and means urging said pawl to a second position spaced forwardly from said first position, said pawl being disposed in said path of movement of the shoulder to be moved rearwardly to said first position by a rearward movement of said shoulder, said linkage including a first portion pivotable about a fixed axis and a second portion spaced from the first portion and carrying said pawl for pivotal movement of said first portion about said axis concomitantly with movement of said pawl between said first and second positions.

References Cited in the file of this patent

UNITED STATES PATENTS

| | | |
|---|---|---|
| 2,460,017 | Lautrup | Jan. 25, 1949 |
| 2,701,856 | Jefferson | Feb. 8, 1955 |